US011797786B2

United States Patent
Lerosey

(10) Patent No.: US 11,797,786 B2
(45) Date of Patent: Oct. 24, 2023

(54) SYSTEM FOR DETECTING RECEIVERS

(71) Applicants: GREENERWAVE, Valbonne (FR); CENTRE NATIONAL DE LA RECHERCHE SCIENTIFIQUE—CNRS, Paris (FR); ECOLE SUPÉRIEURE DE PHYSIQUE ET DE CHIMIE INDUSTRIELLES DE LA VILLE DE PARIS, Paris (FR)

(72) Inventor: Geoffroy Lerosey, Paris (FR)

(73) Assignees: GREENERWAVE, Valbonne (FR); CENTRE NATIONAL DE LA RECHERCHE SCIENTIFIQUE—CNRS, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 206 days.

(21) Appl. No.: 17/421,877

(22) PCT Filed: Feb. 11, 2020

(86) PCT No.: PCT/FR2020/050250
§ 371 (c)(1),
(2) Date: Jul. 9, 2021

(87) PCT Pub. No.: WO2020/174151
PCT Pub. Date: Sep. 3, 2020

(65) Prior Publication Data
US 2022/0121829 A1 Apr. 21, 2022

(30) Foreign Application Priority Data
Feb. 27, 2019 (FR) ..................... 19 02033

(51) Int. Cl.
G08B 21/00 (2006.01)
G06K 7/10 (2006.01)
G06K 7/00 (2006.01)

(52) U.S. Cl.
CPC ....... G06K 7/10099 (2013.01); G06K 7/0008 (2013.01); G06K 7/10475 (2013.01)

(58) Field of Classification Search
CPC ............ G06K 7/10099; G06K 7/0008; G06K 7/10475
See application file for complete search history.

(56) References Cited

U.S. PATENT DOCUMENTS 6,492,942 B1 * 12/2002 Kezys ..................... H01Q 3/26
342/368
6,538,621 B1 * 3/2003 Sievenpiper ......... H01Q 15/008
343/909

(Continued)

FOREIGN PATENT DOCUMENTS

EP 2314961 A1 4/2011
FR 3010836 A1 3/2015

(Continued)

OTHER PUBLICATIONS

International Search Report for PCT/FR2020/050250, dated May 29, 2020, 5 pages.

(Continued)

Primary Examiner — Quang Pham
(74) Attorney, Agent, or Firm — NIXON & VANDERHYE

(57) ABSTRACT

A system for detecting receivers including at least one receiver, a container having a volume for containing the receiver, an antenna suitable for emitting a primary wave in the volume and for receiving a secondary wave emitted by the receiver in the volume in response to reception of the primary wave, and a controller suitable for controlling the (Continued)

emission of the primary wave and for detecting the receiver via the received secondary wave. The system further includes adjustable elements controlled by a control wave, attached to the container and having an impedance that can be modified. Each adjustable element includes a device for recovering energy from the primary wave and/or from the control wave in order to power itself, and a device for receiving the control wave which decodes an adjustment parameter so that the adjustable element controls its impedance.

20 Claims, 2 Drawing Sheets

(56) References Cited

U.S. PATENT DOCUMENTS

| | | | | |
|---|---|---|---|---|
| 8,130,081 | B2* | 3/2012 | Ung | G06K 7/0008 340/10.5 |
| 8,816,633 | B1* | 8/2014 | Neal | H01M 10/44 320/101 |
| 9,041,517 | B2* | 5/2015 | Tietke | G06K 19/0701 340/10.5 |
| 10,609,536 | B2* | 3/2020 | Coussonnet | H04W 4/80 |
| 2003/0048223 | A1* | 3/2003 | Kezys | H04B 7/0857 342/368 |
| 2005/0104790 | A1* | 5/2005 | Duron | H01L 21/823828 257/E21.549 |
| 2005/0280508 | A1* | 12/2005 | Mravca | G06K 7/0008 340/10.2 |
| 2006/0077062 | A1* | 4/2006 | Andrechak | G06K 19/04 235/492 |
| 2007/0057057 | A1* | 3/2007 | Andresky | G06K 7/10356 340/10.1 |
| 2007/0120650 | A1* | 5/2007 | Nagai | G06K 7/0008 340/10.2 |
| 2007/0285236 | A1* | 12/2007 | Batra | G01S 13/74 340/572.1 |
| 2009/0009391 | A1* | 1/2009 | Fox | H01Q 21/0018 342/372 |
| 2009/0085743 | A1* | 4/2009 | Ravi | G06K 7/0008 340/572.1 |
| 2011/0080267 | A1* | 4/2011 | Clare | G06K 7/0008 340/10.4 |
| 2012/0119882 | A1* | 5/2012 | Horst | G06K 7/10356 340/10.1 |
| 2012/0172028 | A1* | 7/2012 | Korus | H04W 72/30 455/422.1 |
| 2012/0176227 | A1* | 7/2012 | Nikitin | G06K 7/10356 340/10.2 |
| 2013/0055734 | A1* | 3/2013 | Wu | F25D 29/005 62/130 |
| 2013/0169415 | A1* | 7/2013 | Bellows | G01S 5/0284 340/10.1 |
| 2013/0342316 | A1* | 12/2013 | Ghaffari | H04Q 9/00 340/10.1 |
| 2014/0002233 | A1* | 1/2014 | Miller | G06F 11/3062 340/3.1 |
| 2014/0071644 | A1* | 3/2014 | Yoon | H05K 1/0216 361/760 |
| 2014/0167918 | A1* | 6/2014 | Stern | G06K 7/10475 340/10.1 |
| 2014/0167965 | A1* | 6/2014 | Sawyer | G06K 7/10316 340/572.4 |
| 2014/0224870 | A1* | 8/2014 | Schoening | G06K 7/10366 235/376 |
| 2014/0277805 | A1* | 9/2014 | Browne, Jr. | H04L 12/2807 315/291 |
| 2014/0368161 | A1* | 12/2014 | Leabman | H02J 50/20 320/108 |
| 2016/0233971 | A1* | 8/2016 | Fink | H01Q 3/46 |
| 2017/0249584 | A1* | 8/2017 | Lavery | H04W 4/80 |
| 2017/0316231 | A1* | 11/2017 | Nogami | G06K 7/10009 |
| 2018/0032046 | A1* | 2/2018 | Balraj | G05B 11/01 |
| 2018/0129834 | A1 | 5/2018 | Nikitin et al. | |
| 2019/0122013 | A1* | 4/2019 | Hussain | G16H 50/00 |
| 2019/0325173 | A1* | 10/2019 | Tingler | G06K 7/10356 |
| 2019/0373574 | A1* | 12/2019 | Anami | H04W 4/33 |
| 2021/0167873 | A1* | 6/2021 | Lerosey | H04B 17/103 |
| 2021/0287506 | A1* | 9/2021 | Clark | G08B 13/2474 |

FOREIGN PATENT DOCUMENTS

| | | |
|---|---|---|
| GB | 2516552 B | 1/2018 |
| GB | 2552918 B | 5/2018 |
| WO | 2015/039769 A1 | 3/2015 |

OTHER PUBLICATIONS

Written Opinion of the International Search Authority for PCT/FR2020/050250, dated May 29, 2020, 6 pages.

French Search Report for FR 19 02033, dated Oct. 29, 2019, 2 pages.

* cited by examiner

SYSTEM FOR DETECTING RECEIVERS

CROSS-REFERENCE TO RELATED APPLICATIONS

This application is the U.S. national phase of International Application No. PCT/FR2020/050250 filed Feb. 11, 2020 which designated the U.S. and claims priority to FR 19 02033 filed Feb. 27, 2019, the entire contents of each of which are hereby incorporated by reference.

TECHNICAL FIELD

This invention relates to a system for detecting receivers.

PRIOR ART

More particularly, the invention relates to a system for detection comprising:
at least one receiver,
a container having a volume, the container being suitable for containing the receiver within its volume,
an antenna suitable for emitting a primary wave in the volume, and for receiving a secondary wave emitted by the receiver in the volume in response to reception of the primary wave,
a controller connected to the antenna, the controller being suitable for controlling the emission of the primary wave and for detecting the receiver via the received secondary wave.

Examples of such systems are known, such as store checkout systems, the receivers being tags of RFID technology placed on items. At checkout, the items are placed in the volume of the container and the system identifies the items and creates the invoice.

DISCLOSURE OF THE INVENTION

The object of the invention is to improve a system for detection of this type, in particular to improve the detection of receiver(s) in the volume.

To this end, a system for detection of the aforementioned type is characterized in that it further comprises adjustable elements having an impedance which can be modified in order to change the manner in which the primary wave is reflected and/or transmitted by the adjustable element, the number N of adjustable elements being greater than or equal to two, and wherein:
the adjustable elements are controlled by a control wave emitted by the controller,
the adjustable elements are attached to the container at a plurality of different positions,
some adjustable elements comprise an energy recovery device for recovering energy from the primary wave and/or from the control wave in order to power themselves, and
each adjustable element comprises a control wave reception device which decodes an adjustment parameter contained in the control wave, said adjustment parameter being intended for the adjustable element so that the adjustable element controls its impedance.

With these arrangements, the system is able to modify the impedance of each adjustable element by means of the secondary wave received by the controller from the receiver(s). It is thus able to optimize its reception of the secondary wave by modifying these impedances.

The system is then able to more effectively detect the presence of one or more receivers inside the volume of the container, regardless of the position of said receivers in this volume of the container.

In addition, the system is simple to implement because the adjustable elements are attached to a container, because they are self-sufficient in energy, and because they do not need to be wired to the controller.

It is then easy for any container to be made suitable for detecting receivers within its volume, even a container which can be moved about within the environment.

Finally, the adjustable elements are elements of reduced size, of very simple design, and able to be produced in quantity at low cost.

In various embodiments of the system according to the invention, recourse may optionally be made to one or more of the following arrangements.

According to one aspect, the number N of adjustable elements is greater than five.

According to one aspect, the controller determines a suitable adjustment parameter for each adjustable element and transmits each adjustment parameter intended for an adjustable element within the control wave.

According to one aspect, each adjustable element comprises an adjustable element memory which stores an adjustable element identifier, the adjustable element identifiers being different for all adjustable elements.

According to one aspect:
the controller transmits identification information with the adjustment parameter intended for an adjustable element, said identification information designating the adjustable element of the system for which the adjustment parameter is intended, and
the reception device of the adjustable element decodes the identification information and the adjustment parameter contained in the control wave, and the adjustable element controls its impedance according to the adjustment parameter if the identification information is equal to its adjustable element identifier.

According to one aspect, each adjustable element in the presence of the primary wave periodically emits its adjustable element identifier, via a control wave, so that the controller can establish a list of the adjustable elements present.

According to one aspect, each adjustable element further comprises a storage member for the energy recovered by the energy recovery device.

According to one aspect, the system further comprises a non-adjustable element having a defined impedance in order to modify the manner in which the primary wave is reflected and/or absorbed by said non-adjustable element.

According to one aspect, the adjustable elements are devices of planar shape, with a circuit portion directly printed on a planar substrate.

According to one aspect, each receiver comprises a receiver memory which stores a receiver identifier, the receiver identifiers being different for all the receivers, and each receiver emits said receiver identifier via the secondary wave.

According to one aspect, the receiver is a device of RFID technology, the antenna then being a detection antenna suitable for this type of receiver.

According to one aspect, the control wave is the primary wave.

According to one aspect, the controller and the antenna are composed of at least two subsystems:

a first subsystem comprising a receiver controller and a receiver antenna, the receiver antenna being suitable at least for emitting the primary wave and receiving the secondary wave, a second subsystem comprising an adjustable element controller and an adjustable element antenna, the adjustable element antenna being suitable for emitting and receiving a control wave.

According to one aspect, the controller comprises a table of coordinates corresponding to the spatial positions of at least part of the adjustable elements according to a frame of reference.

According to one aspect, the controller determines the position of each receiver based on: the reception of each secondary wave, adjustment parameters of the adjustable elements, and spatial positions of the adjustable elements stored in the table of coordinates.

According to one aspect, the container comprises an opening suitable for inserting and/or extracting a receiver into/from the volume of said container, the opening possibly being closed by a movable door.

According to one aspect, the container is comprised in a list of containers comprising a furniture item, a receptacle of a cash register, a bag, a motor vehicle, an airplane, a train, a location.

According to one aspect, each adjustable element comprises:

- a first antenna suitable for receiving the primary wave and for supplying a signal to the energy recovery device and to the reception device, said first antenna having an impedance which can be modified in order to change the manner in which the primary wave is reflected and/or transmitted,
- an electronic circuit powered by the energy recovery device, and which controls the impedance of the first antenna.

According to one aspect, each adjustable element comprises:

- a first antenna suitable for receiving the primary wave and for supplying a signal to the energy recovery device and to the reception device,
- a second antenna having an impedance which can be modified in order to change the manner in which the primary wave is reflected and/or transmitted,
- an electronic circuit powered by the energy recovery device, and which controls the impedance of the second antenna.

BRIEF DESCRIPTION OF DRAWINGS

Other features and advantages of the invention will be apparent from the following description of one of its embodiments, given as a non-limiting example, with reference to the accompanying drawings.

In the drawings.

In the various figures, the same numerical references designate identical or similar elements.

DETAILED DESCRIPTION

Figure 1:
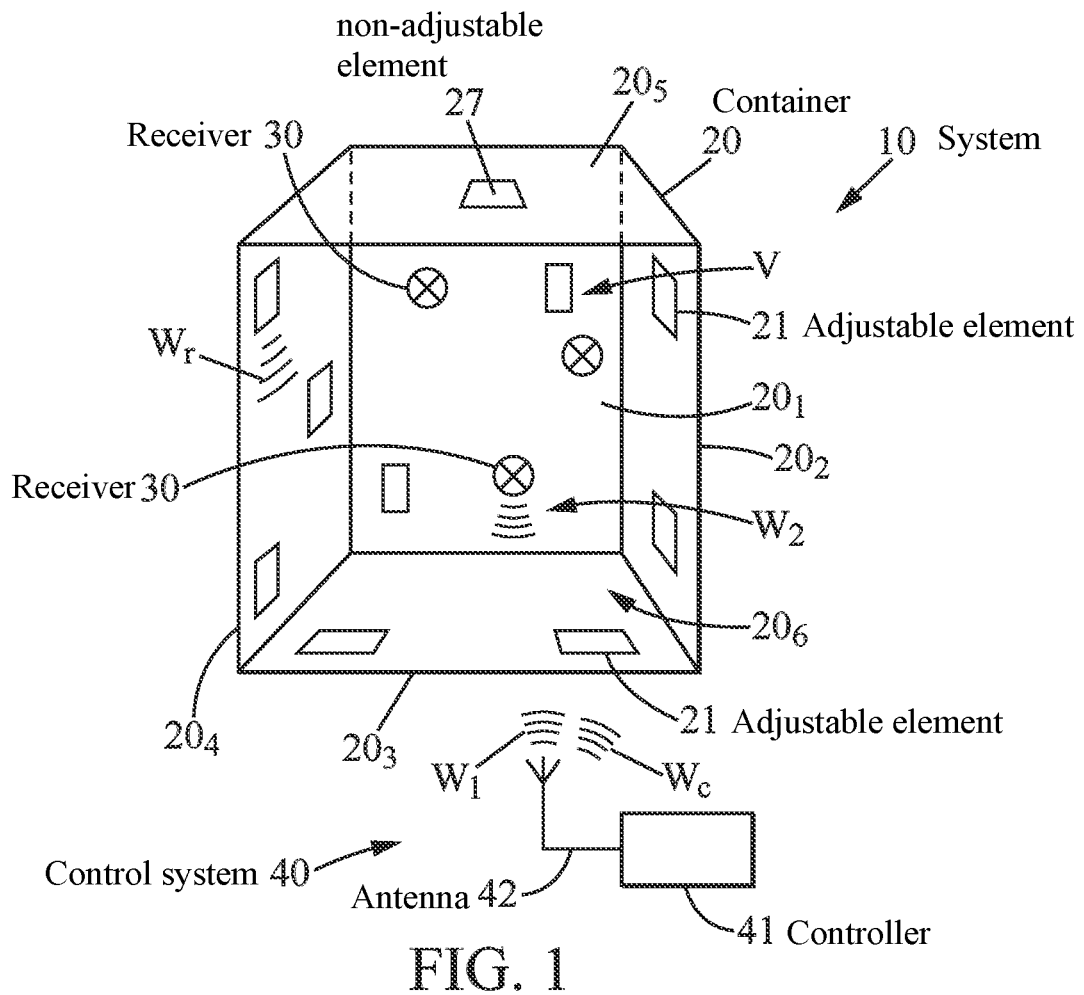
FIG. 1 is a general diagram of an embodiment of the system for detecting receivers according to the invention.

FIG. 1 is a schematic perspective view of one embodiment of a system 10 for detecting receivers, hereinafter referred to as the system 10. In this example, the system 10 comprises a container 20 having a volume V, the container being suitable for containing receivers 30 within its volume. These receivers 30 are, for example, mobile devices that the system will seek to detect and/or identify. An identification or a communication in itself also corresponds to a detection. The system according to the invention is thus a system for detecting a receiver and/or identifying a receiver and/or communicating with a receiver. Such a system 10 is thus suitable for detecting the presence of a receiver 30 within the volume of the container 20, i.e. identifying the receiver 30 within the volume of the container 20, i.e. communicating with the receiver 30 contained within the container 20.

In the particular case of this figure, the container 20 is a parallelepiped comprising a bottom face 201 and four side faces 202, 203, 204, 205, and an open face 206 opposite to the bottom face 201. This container 20 thus forms a container 20 which receivers 30 can be inserted into the volume V thereof and/or be extracted from the volume thereof, through the open face 206. These receivers 30 can also be moved about within the volume V. The figure shows three receivers 30 within the volume V of the container 20.

The system 10 further comprises:

- an antenna 42 suitable for emitting a primary wave $W_1$ in the volume V, and suitable for receiving a secondary wave $W_2$ emitted by each receiver 30 positioned in the volume V in response to reception of the primary wave $W_1$ by this receiver, and
- a controller 41 connected to the antenna 42, the controller being suitable for controlling the emission of the primary wave $W_1$ and for identifying the receiver 30 via the secondary wave $W_2$ received by the antenna 42.

In particular, to identify the receiver(s) 30 within the volume of the container, the system 10 according to the invention further comprises adjustable elements 21 having an impedance which can be modified in order to change the manner in which the primary wave $W_1$ is reflected and/or transmitted by each adjustable element 21.

The number N of adjustable elements 21 is greater than or equal to two, and preferably the number N is greater than five. In this manner, the distribution of the primary wave $W_1$ within the volume of the container 20 can be modified. Optionally, the number N is greater than ten or twenty, in order to further modify the distribution of the primary wave $W_1$ within the volume of the container 20.

The controller 41 emits a control wave $W_c$ to control or drive the adjustable elements 21. A description of the operation and of two embodiments of the controller 41 will be detailed below. Optionally, the control wave $W_c$ is in fact the primary wave $W_1$. Thus, the controller 41 wirelessly controls or drives the adjustable elements of the system 10.

In addition, each adjustable element 21 comprises a control wave $W_c$ reception device 24 which decodes an adjustment parameter contained in this control wave, originating from the controller and intended for one or more adjustable elements. The adjustable element 21 then uses the adjustment parameter to control and modify its impedance.

The control wave $W_c$ can be in the same frequency band as the primary wave $W_1$ or in a different band. Advantageously, these waves are at a different frequency, and the transmissions are independent.

In addition, the adjustable elements 21 are attached to the container 20 at a plurality of different positions. In this manner, the distribution of the primary wave $W_1$ within the volume of the container 20 can be further modified. The positions of the adjustable elements 21 on the container 20 can be optimized for the best possible coverage of the volume V of the container 20 with a minimum number of adjustable elements. This optimization can be achieved experimentally or by simulation with the volume V. A margin can be added to the number of adjustable elements 21, to increase the identification robustness of the system.

In addition, some adjustable elements 21 of the system comprise an energy recovery device 23 for recovering energy from the primary wave $W_1$ and/or the control wave $W_c$ in order to power said adjustable element 21. The adjustable element uses this energy to operate, and in particular to operate its reception device 24 which decodes the adjustment parameter in order to modify its impedance so that the manner in which the primary wave is reflected and/or transmitted by said adjustable element 21 is modified.

The adjustable element 21 is thus self-sufficient in energy and is also autonomous in tuning its impedance. The adjustable element 21 does not need a wired connection with a general control module, and it does not need a wired connection with the controller 41 of the system 10 for detecting receivers.

Advantageously, all the adjustable elements 21 of the system 10 each (individually) have their own energy recovery device and are thus independent. Optionally, one or more adjustable elements 21 are wired to a power supply, but at least one adjustable element 21 and preferably several (at least two) adjustable elements 21 have an energy recovery device.

Optionally, two adjustable elements 21 share a single energy recovery device, or a group of adjustable elements share a single energy recovery device, the group comprising two, three, four, or more adjustable elements 21.

With these arrangements, the adjustable elements 21 or groups of adjustable elements can be attached anywhere on the container 20 without any wiring constraints (inside or outside the container or on any surface of the container). This allows great freedom in placing the adjustable elements 21 in the best possible way to maximize the possibilities for detection and identification of all receivers 30 within the volume V of the container 20. This also makes it possible to equip a container 20 very quickly, since it is sufficient merely to attach the adjustable elements 21 on the container 20 and to position the antenna 42 near the container 20.

The adjustable elements 21 can be attached to the container 20 by any attachment means. For example, the adjustable elements 21 are attached to the container 20 by an adhesive or by an elastic attachment clip or by a screw or by a rivet or by interlocking or by press-fitting.

In addition, the adjustable elements 21 advantageously have a planar shape. A portion of their electrical circuit is for example directly printed on a substrate. The substrate is for example made of paper or cardboard or plastic or fabric, and for example with a face comprising an adhesive. Optionally, the portion of the electrical circuit comprises an antenna. The adjustable elements 21 may also have a flexibility which allows them to be bent in a radius of curvature enabling them to be attached on non-planar surfaces. Due to these arrangements, the adjustable elements 21 can easily be attached to a large number of surfaces (flat or not flat) of a container, which makes it possible to position them at suitable locations for controlling the electromagnetic field inside the container 20.

The system 10 according to the invention may further comprise non-adjustable elements 27 having a predefined and fixed impedance, this impedance being capable of changing the manner in which the primary wave W1 is reflected and/or absorbed by said non-adjustable element 27.

This or these non-adjustable elements 27 are fixed to the container 20 at different positions. These non-adjustable elements 27 make it possible to change in a non-controllable manner the distribution of the primary wave W1 is distributed in the volume V of the container 20. However, these non-adjustable elements 27 can make more effective the possible modifications of the adjustable elements 21.

For example, these non-adjustable elements 27 are elements resonating in the frequency band of the primary wave.

For example, a non-adjustable element 27 can reflect the primary wave and/or absorb the primary wave. This non-adjustable element can make it possible to confine the primary wave within the volume V of the container 20 in order to optimize the efficiency of the adjustable elements 21.

The positions of the non-adjustable elements 27 on the container 20 can be optimized so that the primary wave best covers the volume V of the container 20 with a minimum number of adjustable elements. This optimization can be achieved experimentally and/or by simulation with the volume V.

Figure 2:
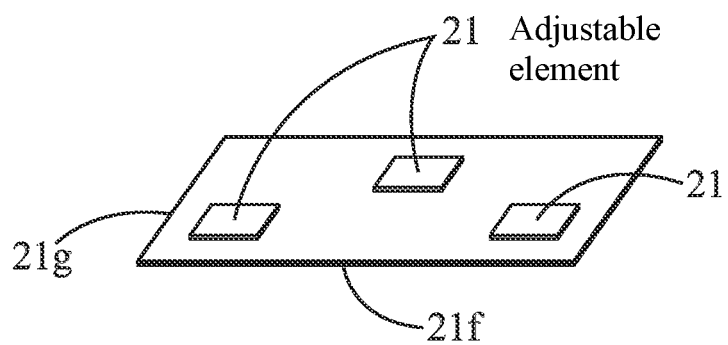
FIG. 2 shows a group of adjustable elements that is usable in the system of FIG. 1.

As shown in FIG. 2 and according to one embodiment, several adjustable elements 21 and/or non-adjustable elements 27 are optionally grouped together into a group of elements 21g on an intermediate support 21s which is then capable of being attached to the container 20, according to any means of attachment and for example according to one of the means listed above. For example, the intermediate support 21s of the group of elements 21g is capable of being attached to the container 20 by an adhesive deposited on a face 21f of said intermediate support.

The intermediate support 21s is for example a sheet or a strip of small thickness, e.g. of a thickness less than 0.2 mm. This intermediate support 21s is for example composed of a flexible polymer material, onto which are attached the adjustable elements 21 and/non-adjustable elements 27, for example by any process such as adhesion. The adjustable elements 21 are themselves circuits of small thickness, so that the group of elements 21g is a thin and flexible device which is easy to attach to a container 20.

The group of elements 21g comprises for example a number M of adjustable elements attached to the intermediate support. The number M of adjustable elements of the group of adjustable elements 21g is for example equal to two, three, or four. The number M of adjustable elements 21 of the group of adjustable elements 21g is preferably less than five.

The adjustable elements 21 and/or the non-adjustable elements 27 of the group of elements 21g can be distributed evenly along a main direction of the intermediate support or can be distributed in any manner on said intermediate support. Preferably, the distance between two adjustable elements of the support will be chosen with design criteria relating to characteristics of the primary wave $W_1$, and in particular its frequency or frequency band.

For example, the adjustable elements 21 of the group of elements 21g remain independent of each other. They are not interconnected by wired connection in order to share a single energy recovery device or share one or more circuits for controlling their impedance. In this manner, the adjustable elements 21 and/or non-adjustable elements 27 included in the group are all identical and easily implemented. This standardization gives great modularity to the implementation of each adjustable element 21 and to each product of a group of elements 21g. Sheets or strips of adjustable elements can be produced in large quantities and at low cost.

Adjustable elements 21 is understood to mean any type of adjustable elements suitable for modifying the manner in which a wave is reflected and/or transmitted by said adjustable elements 21.

According to a first example, patent document no. U.S. Pat. No. 6,538,621 shows an example of an electromagnetic surface whose impedance is tunable or modifiable. This electromagnetic surface comprises a plurality of resonant elements, each resonant element being tunable. The electromagnetic surface of this document comprises plate elements located at a distance from a ground plane, neighboring plate elements being connected to each other by a variable capacitor, each variable capacitor being controllable by a control potential. The impedance of the electromagnetic surface is thus modified, for example to focus the reflected wave or to give a spatial direction to the reflected wave 42. Optionally, the electromagnetic surface is composed of a plurality of cells, each cell comprising two different resonant elements.

According to a second example, patent document no. WO 2015/039769 cites and shows other types of resonant elements that can be used in an electromagnetic surface with tunable impedance:
  a variable diode can replace the variable capacitor,
  the resonant elements can be of a single polarization type or two polarization types, optionally distributed in an alternating manner on the surface,
  the resonant elements have one or more resonant frequencies in order to control a predetermined frequency band,
  the resonant elements are binary elements with two states, for example defined by a change of phase or amplitude of the modified wave.

The two documents cited above differ from the present invention at least in that the adjustable elements are connected by wire or cable to a central controller, and in that they do not comprise an energy recovery device. In addition, they are not attached to a container, since these systems serve as a free-field communication antenna. On the contrary, in the present invention the adjustable elements 21 are controlled by a control wave via a wireless link. They are energy-independent and connection-independent.

Many variations of known resonant elements may be used to form adjustable elements of an electromagnetic surface with tunable impedance.

Advantageously, the impedance of the resonant elements can be modified by an integrated circuit, this integrated circuit comprising the energy recovery device and this integrated circuit being able to directly modify the adjustable impedance of the adjustable element. For example, an RFID badge has this type of architecture.

The state of the adjustable elements 21 of the system 10 is defined by the adjustment parameters determined by the controller 41, i.e. a set of parameters.

The controller 41 controls for example all the adjustable elements 21 (for example, variable capacitor or diode), which makes it possible to modify the impedance of each one. This modification is much more complex than focusing or spatial directivity. It modifies the spatial distribution of the primary wave $W_1$ within the volume V of the container 20.

According to a first embodiment of the controller 41, the controller 41 also monitors the secondary wave $W_2$ received by the antenna 42: for example, it determines reception information concerning the reception of the wave by its antenna 42, this reception information being for example the reception level and/or the reception quality.

The controller 41 can then use the reception information to estimate a value to be optimized, this value being one of these items of information or a combination of these items of reception information.

The controller 41 executes for example an optimization algorithm on the basis of the set of (temporally) previous parameters, previous estimated values, and the current estimated value.

The optimization algorithm can be a maximization or a minimization of the estimated value, depending on the magnitude represented by this value. In one or more successive steps, the optimization algorithm makes it possible to obtain an optimal set of parameters. At each step or at predetermined intervals, the controller 41 applies the new set of parameters to the adjustable elements 21 and/or determines reception information for performing the next iteration. These iterations can be carried out at a very fast pace so that the duration of this optimization is very short in view of the number of receivers to be detected and/or identified in the volume.

The optimal set of parameters makes it possible, for example, to improve the level of reception of the secondary wave $W_2$ at the antenna 42. Due to this modification by the optimized state of the adjustable elements 21 (modification of the electromagnetic impedance of the adjustable elements 21), the field of propagation of the secondary wave $W_2$ towards the antenna 42 is improved, and the detection and/or identification of each receiver in the volume is improved.

Thus, the controller 41 determines the set of parameters for adjusting the plurality of adjustable elements 21, for example in order to optimize the reception of the secondary wave $W_2$ by the antenna 42. The optimization concerns the estimated value, which is for example an estimate of the level of reception and/or of the quality of reception of the secondary wave $W_2$ by the antenna 42.

According to a variant, the controller 41 comprises a memory which stores one or more sets of optimal parameters for detecting receivers. In this manner, the optimization algorithm can start its process based on one or more of the saved sets of parameters, which saves time in the optimization and avoids transient effects.

According to one variant, the optimization algorithm monitors its performance and stops its optimization iterations when a stop criterion is reached. In this manner, insignificant variations or fluctuations in the reception of the secondary wave $W_2$ can be avoided.

According to a second embodiment of the controller 41, the controller 41 periodically defines adjustment parameters for the adjustable elements 21 in a random manner in order to scan a set of combinations of adjustment parameters, which makes it possible to scan the volume V of the container. Each time the adjustable elements are adjusted, the controller 41 then also emits a primary wave $W_1$ in order to detect receivers 30 with this new adjustment. This procedure allows it to detect a new receiver 30 in the volume. After a predefined number of combinations, this procedure makes it possible to have knowledge of all receivers 30 in the volume V.

According to a third embodiment of the controller 41, the controller 41 periodically defines adjustment parameters for the adjustable elements 21 according to a previously saved table, in order to scan a set of combinations of adjustment parameters.

This previously saved table is for example defined by knowledge of the propagation of the primary waves $W_1$ within the volume V, either by simulation or by measurement in the medium of the volume V. The previously stored table is for example defined to ensure the ability to scan the entire volume V with a predefined spatial precision.

Then the controller proceeds as above: Each time the adjustable elements are adjusted, the controller 41 then also emits a primary wave $W_1$ in order to detect receivers 30 with this new adjustment. This procedure allows it to detect a new receiver 30 within the volume. After a predefined number of combinations, this procedure makes it possible to have knowledge of all receivers 30 in the volume V.

According to a variant, the controller 41 periodically performs, for example during a predetermined duration (a duration and/or a defined day during a week and/or during a month), a calibration of said previously stored table by searching for the optimum adjustment parameters for reference adjustable elements.

This further optimization can be based on the return wave $W_r$ received by the controller 41. Similarly to the receivers 30, the controller 41 determines reception information concerning the reception of the return wave by its antenna (level of reception and/or quality of reception). The controller 41 then performs an optimization of all adjustment parameters for one or more reference adjustable elements among the set of adjustable elements 21.

Following these optimizations of adjustment parameters for reference adjustable elements, the controller 41 deduces the previously stored table therefrom by various techniques, such as a parameterization model and/or an interpolation technique.

Finally, the previous embodiments of the controller 41 can be combined to create part of the adjustment parameters by optimization on the received secondary wave, part of the adjustment parameters by random adjustment, and part of the adjustment parameters by predefinition within the volume V. This strategy allows even more receivers to be identified in the volume V.

In addition, for an adjustable element 21 to be able to receive and decode an adjustment parameter intended for it, the controller 41 determines this adjustment parameter, for example according to the optimization procedure described above, for each adjustable element 21 included in the system for detection 10, and the controller 41 transmits each adjustment parameter to an adjustable element 21 in its emission of the control wave $W_c$.

In particular, this transmission in the control wave $W_c$ is achieved by any type of coding and/or any type of modulation in the control wave $W_c$ emission signal that the controller 41 supplies to the antenna 42.

In addition, the adjustable elements 21 advantageously comprise an adjustable element memory which stores an adjustable element identifier IDer, this adjustable element identifier being different for each adjustable element, which allows differentiating between them all.

In this case, the controller 41 can emit, in a control wave emission $W_c$, identification information IID with an adjustment parameter, which makes it possible to designate the adjustable element 21 of the system for which said adjustment parameter is intended. The controller 41 thus emits for example the entire set of parameters (all the adjustment parameters) sequentially, each adjustment parameter being associated with identification information so that the adjustable element 21 intended to receive said adjustment parameter is the only one to apply the adjustment parameter in question.

The reception device 24 of the adjustable element 21 then decodes the identification information IID and the adjustment parameter in the control wave $W_c$. Next, the adjustable element 21 controls its impedance according to the adjustment parameter if the identification information is equal to its adjustable element identifier IDer.

The controller 41 optionally periodically emits primary waves $W_1$ in the volume V of the container 20 in order to detect and identify receivers 30, and it periodically emits control waves $W_c$ in the volume V in order to optimize and adjust the adjustable elements 21 attached to the container. 20. Each adjustable element 21 selects the adjustment parameter intended for it.

According to a variant of the adjustable elements 21, one or more adjustable elements 21 each comprise an adjustable element memory which stores a set of adjustment parameters (previously saved and/or saved by transmission from the controller) and a reading period. This set of adjustment parameters and this reading period are known to the controller 41. This arrangement can enable the controller 41 to avoid systematically sending new adjustment parameters to the adjustable elements 21; i.e. this reduces the need for transmission. Optionally, this set of adjustment parameters and/or this reading period are different for each adjustable element 21.

According to a first variant of the controller 41, the controller 41 comprises, in a memory, a table of adjustable element identifiers, this table being filled in with the adjustable element identifiers IDer of the system 10 in order to be able to send the adjustable element identifier with the adjustment parameter.

According to a second variant of the controller 41, the controller 41 can dynamically establish the table of adjustable element identifiers. To do this, each adjustable element 21 periodically emits its adjustable element identifier IDer, via a return wave $W_r$. The controller 41 then establishes the list of adjustable elements present in the system 10 in order to fill in said table of adjustable element identifiers. In particular, a new adjustable element 21 will be entered in this table after reception of its adjustable element identifier IDer. Furthermore, an adjustable element 21 can be removed from said table or be deactivated in said table (by an activity flag) if the controller 41 does not receive the identifier of an adjustable element within a period of time greater than a inactivation time limit for an adjustable element.

By this dynamic operation, the controller 41 will thus always use adjustable elements 21 that are effective or functional. This dynamic operation also facilitates installation of the system 10 which adapts automatically adapted to the adjustable elements 21 present.

In addition, according to one variant, the adjustable element 21 of the previous type will periodically emit its adjustable element identifier IDer only in the presence of a primary wave $W_1$ and/or a control wave $W_c$ coming from the antenna 42 of the controller 41, in particular:
  either because this adjustable element 21 uses an energy recovery device 23 to recover energy from this wave for its operation. In the absence of energy, the adjustable element 21 will be automatically switched off and will not broadcast its identifier;
  or because this adjustable element 21 is designed not to emit its identifier if it has not received a primary wave $W_1$ or a control wave $W_c$ for a period of time greater than a predefined standby period.

In addition, the adjustable element 21 may further include an energy storage member suitable for storing and possibly accumulating energy received by the energy recovery device 23. In this manner, the adjustable element 21 will have more autonomy and is able to operate for a period of time determined by the capacity of said energy storage member. This energy storage member is for example an electrical capacitor, or a battery, or any other energy storage device.

According to a third variant of the controller 41, the controller 41 comprises, in a memory, a table of coordinates corresponding to the spatial positions of at least part of the adjustable elements 21 attached to the container 20, said coordinates being stored according to a same frame of reference.

The controller 41 thus has knowledge of the positions of these adjustable elements 21 of the system 10. The controller 41 is then able to determine the position of the receiver(s) 30 within the volume V of the container 20 based on: the reception of each secondary wave $W_2$ coming from a receiver 30, adjustment parameters of the adjustable elements 21, and spatial positions of the adjustable elements 21 stored in the table of coordinates.

In addition, the receiver(s) 30 of the system 10 comprise a receiver memory which stores a receiver identifier IDr. All of the receivers 30 have different receiver identifiers. A receiver 30 emits its receiver identifier IDr in a secondary wave $W_2$, in response to a primary wave $W_2$ that it receives from the antenna 42.

The receiver 30 is for example a device of radio frequency identification technology or RFID.

The receiver 30 is for example a connected object, for example of the Internet of Things (IoT) type or of the type with transmission via WiFi or Bluetooth or LoRA network.

Optionally, the receiver 30 comprises one or more sensors. One or more of the values measured by a sensor are stored in the receiver memory or other memory. In response to a primary wave $W_1$ received by the receiver 30, this receiver 30 is then capable of transmitting in a secondary wave $W_2$ its receiver identifier IDr and one or more values of a sensor.

The sensor(s) are for example a temperature sensor, a humidity sensor, a presence detection sensor, a gas detection sensor, a flow sensor, a voltage sensor, a current sensor, or any other type of sensor.

In this case, the receivers 30 can be movable within the volume V or fixed within the volume V, meaning in a fixed position within the volume V. For example, a receiver 30 including a sensor will be attached to a device for which a quantity measured by said sensor is to be monitored, this device itself being movable within the volume V.

For example, system 10 can detect the presence of and/or identify products in a volume to which such a receiver is attached, and this system can monitor the temperature of the product. This application is particularly relevant in food, the container then for example being a refrigerator or a refrigerated chamber.

The system 10 according to the invention, incorporating controllable and autonomous adjustable elements 21, is then a very efficient receiver detection and/or identification system 30 because it is capable of optimizing the reception of the primary wave $W_1$ at the receivers 30 due to the information returned from said receivers 30 via their secondary wave $W_2$ which allows the controller 41 to determine adjustment parameters transmitted to the adjustable elements 21 via the control wave $W_c$.

This system 10 is also very simple to implement because the adjustable elements 21 are autonomous: these adjustable elements 21 do not need to be wired to the controller 41 by a wired link because they recover energy via the primary wave $W_1$ received and/or via the control wave $W_c$ and because they receive their adjustment parameter via coding in said control wave $W_c$.

This system 10 has many industrial applications.

For example, the container 20 may be:
furniture equipped with adjustable elements 21, such as storage furniture suitable for receiving products, for example a cupboard, a shelving unit, each product having a receiver attached thereto, or such as office furniture for example a desk, a table; or
a store's cash register equipped with adjustable elements 21, into which products are inserted. The system will be able to identify the products by the receivers attached to these products, and the cash register will be able to create an invoice; or
a store's shopping cart equipped with adjustable elements 21; or
a bag equipped with adjustable elements 21, for example a shopping bag; or
a motor vehicle or an airplane or a train equipped with adjustable elements 21; or
a location equipped with adjustable elements 21, for example an industrial space such as a warehouse, or a living room, or a retail space in a shopping center.

These containers 20 comprise an opening (such as the opening face 206 of FIG. 1) which is suitable for inserting and/or extracting a receiver into/from the volume V of the container 20. This opening 20 can be equipped with a movable door for closing it temporarily.

Figure 3:
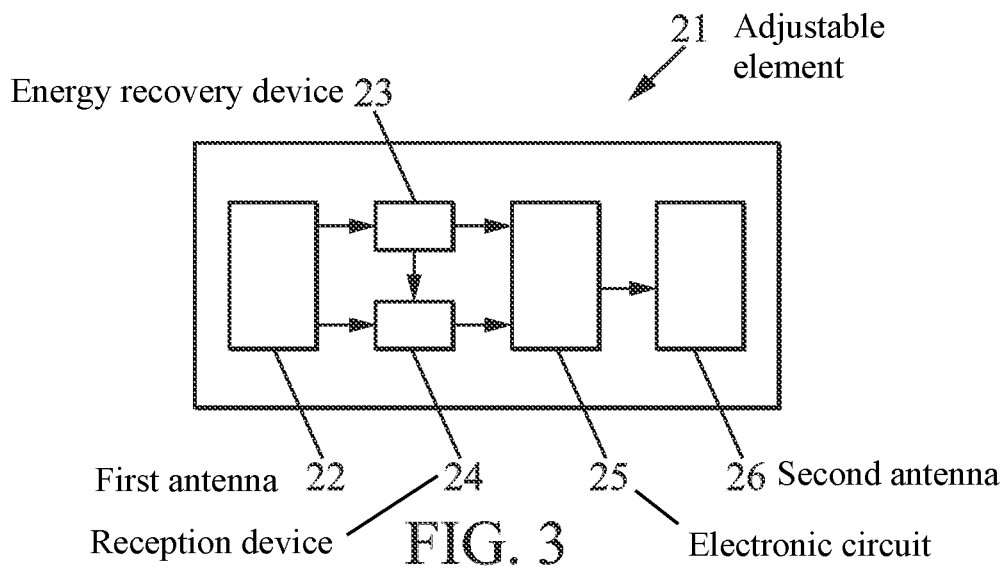
FIG. 3 is a first variant of an adjustable element of the system of FIG. 1.

FIG. 3 shows a first variant of an adjustable element 21 used in the system for detection 10 according to the invention.

This adjustable element 21 comprises:
a first antenna 22 suitable for receiving the primary wave $W_1$ and/or the control wave $W_c$ and for supplying a signal to the energy recovery device 23 and to the reception device 24,
a second antenna 26 having an impedance which can be modified in order to change the manner in which the primary wave $W_1$ is reflected and/or transmitted within the volume V,
an electronic circuit 25 powered by the energy recovery device, and which controls the impedance of the second antenna 26.

In this adjustable element 21, the energy recovery device 23 accumulates energy via the signal received by the first antenna 22, by any type of means as described above, and powers the reception device 24 and the electronic circuit 25.

The control wave $W_c$ reception device 24 decodes an adjustment parameter contained in this wave. The electronic circuit 25 powered by the energy recovery device 23 then uses the adjustment parameter to control and modify the impedance of the second antenna 26.

Figure 4:
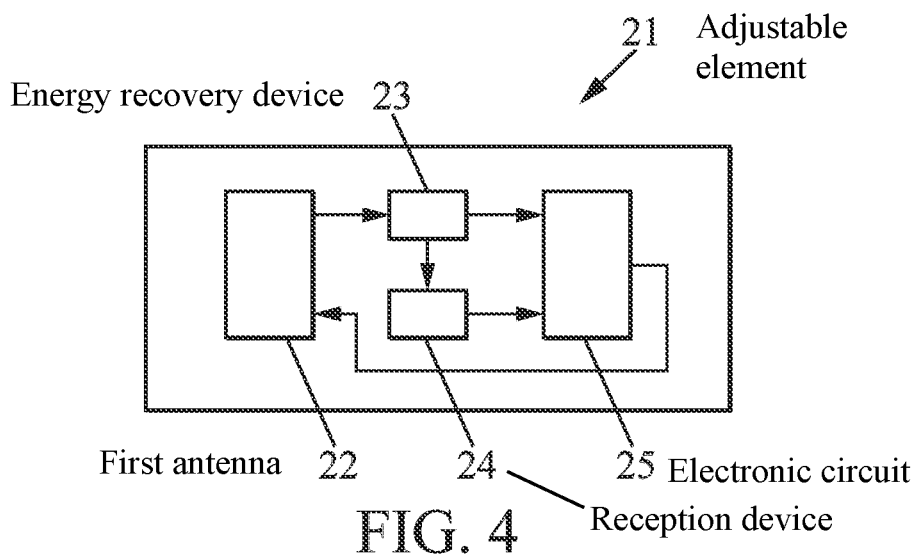
FIG. 4 is a second variant of an adjustable element of the system of FIG. 1.

FIG. 4 shows a second variant of an adjustable element 21 used in the system for detection 10 according to the invention. This adjustable element comprises only one common antenna for reception of the control wave $W_c$ and for the impedance tuning which changes the manner in which the primary wave $W_1$ is reflected and/or transmitted by said antenna.

Thus, as shown in the figure, this adjustable element 21 comprises:
a first antenna 22 suitable for receiving the control wave $W_c$ and for supplying a signal to the energy recovery device 23 and to the reception device 24, said first antenna 22 having an impedance which can be modified in order to change the manner in which the primary wave $W_1$ is reflected and/or transmitted, and an electronic circuit 25 powered by the energy recovery device, and which controls the impedance of the first antenna 22.

Returning to FIG. 1, the controller 41 and the antenna 42 form an assembly, a first embodiment of a control system 40. This control system 40:

emits the primary wave $W_1$ to the receivers 30 and receives the secondary wave $W_2$ in return from the detected receivers 30, in order to detect and/or identify the receiver(s) 30; and emits control waves $W_c$ to the adjustable elements 21 and receives a return wave $W_r$ for each adjustable element 21 having received its adjustment parameter in the preceding control wave, this return wave $W_r$ thus corresponding to a confirmation of the change of impedance effected by said adjustable element 21, in order to optimize detection of the receivers 30 in the volume V.

In this embodiment, the detection of receivers 30 and the tuning of the adjustable elements 21 are carried out by a single controller 41.

Figure 5:
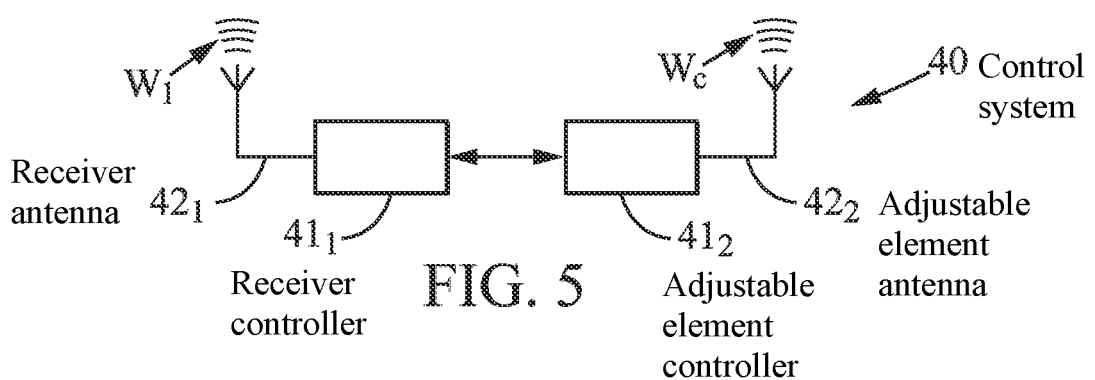
FIG. 5 is a schematic illustration of a second embodiment of the control system, composed of at least two subsystems.

FIG. 5 represents a second embodiment of the control system 40, composed of at least two subsystems.

This control system 40 thus comprises:

a first subsystem comprising a receiver controller $41_1$ and a receiver antenna 421, the receiver antenna being suitable at least for emitting the primary wave $W_1$ and receiving the secondary wave $W_1$ in order to detect and/or identify the receiver(s) 30; and a second subsystem comprising an adjustable element controller $41_2$ and an adjustable element antenna 422, the adjustable element antenna being suitable for emitting a control wave $W_c$ to the adjustable elements 21 and for receiving a return wave $W_r$ for each adjustable element 21 having received its adjustment parameter in the preceding control wave.

In this embodiment, detection of the receivers 30 is carried out by the receiver controller $41_1$, and optimization of the adjustable elements 21 is carried out by the adjustable element controller $41_2$. However, the receiver controller $41_1$ optionally transmits information to the adjustable element controller $41_2$ via a wired or wireless connection in order to determine the adjustment parameters as is described above.

Other distributions of the functions of the system for detection 10 are conceivable.

Finally, the principle of adjustable elements that are self-sufficient in energy and controlled independently of one another by wireless transmission for each of them can also be used for waveform shaping devices such as described in patent document no. WO 2015/039769, a wave shaping device independent of a source and independent of mobile devices and which for mobile devices makes it possible to improve reception of the primary wave from the source.

The invention claimed is:

1. System for detecting receivers, comprising:
   at least one receiver,
   a container having a volume, the container being suitable for containing the receiver within its volume,
   an antenna suitable for emitting a primary wave in the volume, and for receiving a secondary wave emitted by the receiver in the volume in response to reception of the primary wave,
   a controller connected to the antenna, the controller being suitable for controlling the emission of the primary wave and for detecting the receiver via the received secondary wave, wherein the system further comprises adjustable elements each having an impedance which can be modified in order to change the manner in which the primary wave is reflected and/or transmitted by the adjustable element, a number N of adjustable elements being greater than or equal to two, and
   wherein:
   the adjustable elements are controlled by a control wave emitted by the controller,
   the adjustable elements are attached to the container at a plurality of different positions,
   some adjustable elements comprise an energy recovery device for recovering energy from the primary wave and/or from the control wave in order to power themselves, and
   each adjustable element comprises a control wave reception device which decodes an adjustment parameter contained in said control wave, said adjustment parameter being intended for the adjustable element so that the adjustable element controls said adjustment element's impedance.

2. The system according to claim 1, wherein the number N of adjustable elements is greater than five.

3. The system according to claim 1, wherein the controller determines a suitable adjustment parameter for each adjustable element and transmits each adjustment parameter to an adjustable element within the control wave.

4. The system according to claim 1, wherein each adjustable element comprises an adjustable element memory which stores an adjustable element identifier, the adjustable element identifiers being different for all adjustable elements.

5. The system according to claim 4, wherein:
   the controller transmits identification information with the adjustment parameter intended for an adjustable element, said identification information designating the adjustable element of the system for which the adjustment parameter is intended, and
   the reception device of the adjustable element decodes the identification information and the adjustment parameter contained in the control wave, and the adjustable element controls said adjustment element's impedance according to the adjustment parameter if the identification information is equal to said adjustment element's adjustable element identifier.

6. The system according to claim 4, wherein each adjustable element in the presence of the primary wave periodically emits said adjustment element's adjustable element identifier, via a control wave, so that the controller can establish a list of the adjustable elements present.

7. The system according to claim 1, wherein each adjustable element further comprises a storage member for the energy recovered by the energy recovery device.

8. The system according to claim 1, further comprising a non-adjustable element having a defined impedance in order to modify the manner in which the primary wave is reflected and/or absorbed by said non-adjustable element.

9. The system according to claim 1, wherein the adjustable elements are devices of planar shape, with a circuit portion directly printed on a planar substrate.

10. The system according to claim 1, wherein each receiver comprises a receiver memory which stores a receiver identifier, each receiver identifier being different from all other receiver identifiers, and wherein each receiver emits its respective receiver identifier via the secondary wave.

11. The system according to claim 1, wherein the receiver is a device of RFID technology, the antenna then being a detection antenna suitable for this type of receiver.

12. The system according to claim 1, wherein the control wave is the primary wave.

13. The system according to claim 1, wherein the controller and the antenna are composed of at least two subsystems:
- a first subsystem comprising a receiver controller and a receiver antenna, the receiver antenna being suitable at least for emitting the primary wave and receiving the secondary wave,
- a second subsystem comprising an adjustable element controller and an adjustable element antenna, the adjustable element antenna being suitable for emitting and receiving a control wave.

14. The system according to claim 1, wherein the controller comprises a table of coordinates corresponding to spatial positions of at least part of the adjustable elements according to a frame of reference.

15. The system according to claim 14, wherein the controller determines a position of each receiver based on: the reception of each secondary wave, adjustment parameters of the adjustable elements, and spatial positions of the adjustable elements stored in the table of coordinates.

16. The system according to claim 1, wherein the container comprises an opening suitable for inserting and/or extracting a receiver into/from the volume of said container, the opening possibly being closed by a movable door.

17. The system according to claim 16, wherein the container is comprised in a list of containers comprising a furniture item, a receptacle of a cash register, a bag, a motor vehicle, an airplane, a train, a location.

18. The system according to claim 1, wherein each adjustable element comprises:
- a first antenna suitable for receiving the primary wave and for supplying a signal to the energy recovery device and to the reception device, said first antenna having an impedance which can be modified in order to change the manner in which the primary wave is reflected and/or transmitted,
- an electronic circuit powered by the energy recovery device, and which controls the impedance of the first antenna.

19. The system according to claim 1, wherein each adjustable element comprises:
- a first antenna suitable for receiving the primary wave and for supplying a signal to the energy recovery device and to the reception device,
- a second antenna having an impedance which can be modified in order to change the manner in which the primary wave is reflected and/or transmitted,
- an electronic circuit powered by the energy recovery device, and which controls the impedance of the second antenna.

20. The system according to claim 2, wherein the controller determines a suitable adjustment parameter for each adjustable element and transmits each adjustment parameter to an adjustable element within the control wave.

\* \* \* \* \*